(12) United States Patent
Smith et al.

(10) Patent No.: US 12,490,733 B2
(45) Date of Patent: Dec. 9, 2025

(54) SYSTEM AND METHOD FOR AN AGRICULTURAL MACHINE

(71) Applicants: CNH Industrial America LLC, New Holland, PA (US); Kansas State University Research Foundation, Manhattan, KS (US)

(72) Inventors: Kevin M. Smith, Narvon, PA (US); Jeremy A. Amundson, Willmar, MN (US); Aryan Singh Dalal, Manhattan, KS (US); Ajay Sharda, Manhattan, KS (US)

(73) Assignees: CNH Industrial America LLC, New Holland, PA (US); Kansas State University Research Foundation, Manhattan, KS (US)

( * ) Notice: Subject to any disclaimer, the term of this patent is extended or adjusted under 35 U.S.C. 154(b) by 69 days.

(21) Appl. No.: 18/626,856

(22) Filed: Apr. 4, 2024

(65) Prior Publication Data

US 2025/0311713 A1   Oct. 9, 2025

(51) Int. Cl.
 *G06T 7/70* (2017.01)
 *A01M 7/00* (2006.01)
 *G06V 20/56* (2022.01)

(52) U.S. Cl.
 CPC ........ *A01M 7/0089* (2013.01); *A01M 7/0075* (2013.01); *G06T 7/70* (2017.01);
 (Continued)

(58) Field of Classification Search
 CPC ..... A01M 7/0089; A01M 7/0075; G06T 7/70; G06T 2207/20081; G06T 2207/20132;
 (Continued)

(56) References Cited

U.S. PATENT DOCUMENTS

| 4,186,878 A | 2/1980 | Lestradet |
| 6,027,039 A | 2/2000 | Mercil |

(Continued)

FOREIGN PATENT DOCUMENTS

| BR | 102020004851 A2 | 10/2020 |
| CN | 104330279 A | 2/2015 |

(Continued)

OTHER PUBLICATIONS

Co-Pending U.S. Appl. No. 18/127,348, filed Mar. 28, 2023.
(Continued)

*Primary Examiner* — Bao Long T Nguyen
(74) *Attorney, Agent, or Firm* — Dority & Manning, P.A.

(57) ABSTRACT

An agricultural system can include a boom assembly including a frame section and a boom section pivotably coupled to the frame section. One or more nozzle assemblies may be operably coupled with the boom assembly. A boom movement sensor may be configured to generate image data and a machine sensor may be configured to generate machine data. A computing system may be communicatively coupled to the sensor. The computing system may be configured to determine an estimated boom position of the boom section based at least in part on the machine data, determine a position of a target within the image data based at least in part on the estimated boom position of the boom section, modify the image data based on the position of the target to create modified image data, and determine a magnitude of deflection based on the modified image data.

20 Claims, 12 Drawing Sheets

(52) U.S. Cl.
CPC .... *G06V 20/56* (2022.01); *G06T 2207/20081* (2013.01); *G06T 2207/20132* (2013.01); *G06T 2207/30188* (2013.01); *G06T 2207/30252* (2013.01); *G06V 2201/07* (2022.01)

(58) Field of Classification Search
CPC .......... G06T 2207/30188; G06T 2207/30252; G06V 20/56; G06V 2201/07; G06V 10/82
See application file for complete search history.

(56) References Cited

U.S. PATENT DOCUMENTS

| | | | |
|---|---|---|---|
| 6,202,013 | B1 | 3/2001 | Anderson et al. |
| 6,315,218 | B1 | 11/2001 | Guesdon |
| 6,454,294 | B1 | 9/2002 | Bittner et al. |
| 6,644,562 | B2 | 11/2003 | Tango |
| 7,040,552 | B2 | 5/2006 | McCrea et al. |
| 7,426,827 | B2 | 9/2008 | Thompson et al. |
| 7,472,009 | B2 | 12/2008 | Baldwin |
| 7,752,779 | B2 | 7/2010 | Schoenmaker et al. |
| 8,086,370 | B2 | 12/2011 | Tollenaar |
| 8,488,874 | B2 | 7/2013 | Zaman et al. |
| 9,204,626 | B2 | 12/2015 | Vitali et al. |
| 9,382,003 | B2 | 7/2016 | Burema et al. |
| 9,832,925 | B2 | 12/2017 | Leeb |
| 9,994,307 | B2 | 6/2018 | Nguyen et al. |
| 10,095,235 | B2 | 10/2018 | Sugumaran et al. |
| 10,244,747 | B2 | 4/2019 | Leeb et al. |
| 10,252,285 | B2 | 4/2019 | Barker et al. |
| 10,316,929 | B2 | 6/2019 | Wang et al. |
| 12,207,646 | B2 * | 1/2025 | Bittner ............... A01M 7/0089 |
| 2013/0068892 | A1 | 3/2013 | Bin Desa et al. |
| 2015/0305232 | A1 | 10/2015 | Rosenbaum et al. |
| 2016/0255769 | A1 | 9/2016 | Leeb |
| 2017/0131718 | A1 | 5/2017 | Matsumura et al. |
| 2017/0305537 | A1 | 10/2017 | Smith et al. |
| 2018/0156770 | A1 | 6/2018 | Saez et al. |
| 2018/0281798 | A1 | 10/2018 | Kremmer et al. |
| 2018/0364157 | A1 | 12/2018 | Ghiraldi et al. |
| 2021/0127567 | A1 | 5/2021 | Loukili et al. |
| 2021/0289766 | A1 | 9/2021 | Long et al. |
| 2021/0368770 | A1 | 12/2021 | Bittner |
| 2021/0368771 | A1 | 12/2021 | Bittner |
| 2021/0368772 | A1 | 12/2021 | Stanhope et al. |

FOREIGN PATENT DOCUMENTS

| | | |
|---|---|---|
| CN | 204236769 | 4/2015 |
| CN | 107235146 A | 10/2017 |
| CN | 107907365 A | 4/2018 |
| CN | 107963214 A | 4/2018 |
| CN | 108152071 A | 6/2018 |
| CN | 111248180 A | 6/2020 |
| DE | 102019203394 A1 | 9/2020 |
| EP | 3235380 | 10/2017 |
| EP | 3372078 | 9/2018 |
| EP | 2835050 B1 | 10/2020 |
| EP | 3585168 B1 | 3/2021 |
| GB | 2457388 | 8/2009 |
| GB | 2521343 | 6/2015 |

OTHER PUBLICATIONS

Bjornsson et al, Dynamic Analysis of the Intelligent Sprayer Boom, 11th International Conference on Vibration Problems, Lisbon, Portugal, Sep. 9-12, 2013, 12 pages. http://icoev.org/proceedings2013/391_paper0.pdf.

Sensefly, Agriculture, Parrot Group, Apr. 5, 2019, 11 pages. https://www.sensefly.com/industry/agriculture/.

Thomas-Murphy, Mobile Applications, Field Crops, Cornell CALS, dated 2021, 4 Pages. https://fieldcrops.cals.cornell.edu/tools-resources/mobile-apps/.

Yan et al., Evaluation of Spray Accuracy for an Experimental Greenhouse Variable-Rate Spray System, 2018 ASABE Annual International Meeting, Detroit, Michigan, Jul. 29, 2018-Aug. 1, 2018, 16 pages. https://scihub.bkvisa.net/10.13031/aim201800183.

\* cited by examiner

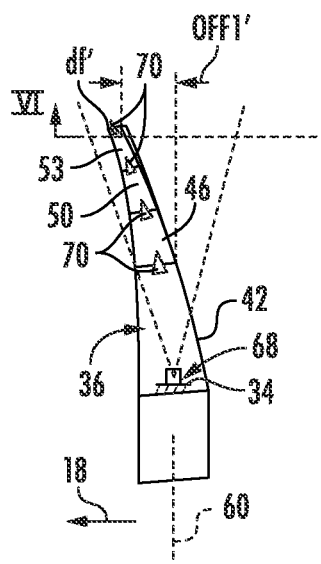
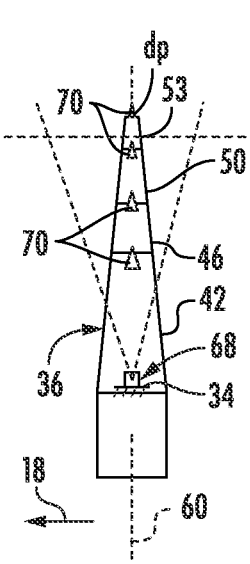
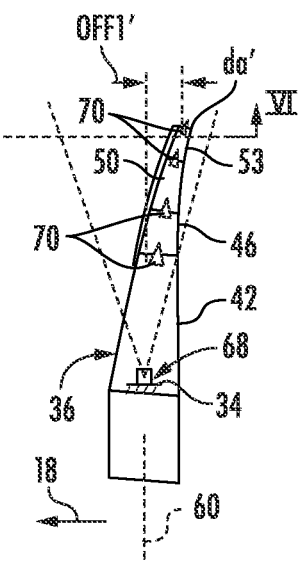
FIG. 4B  FIG. 4A  FIG. 4C
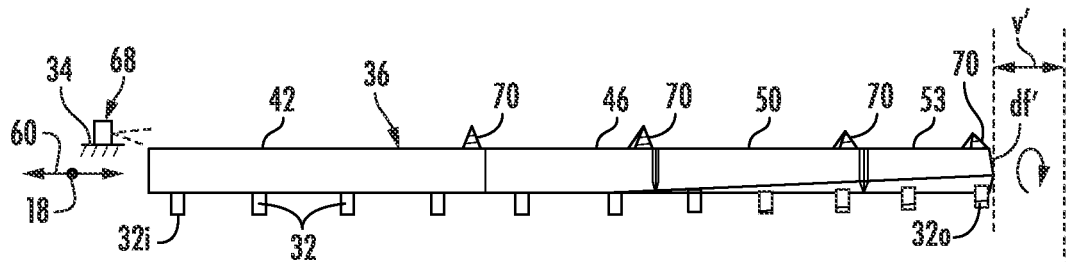
FIG. 5B
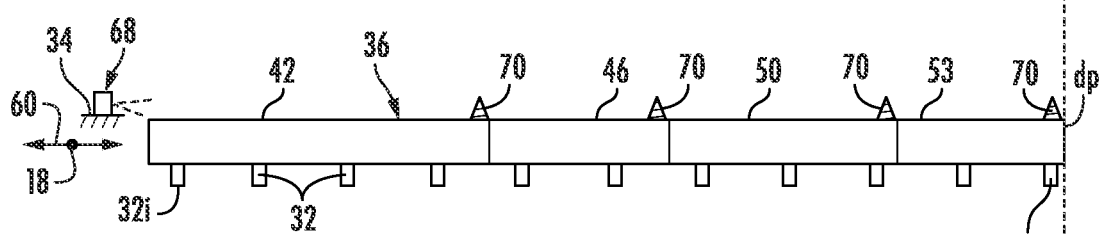
FIG. 5A
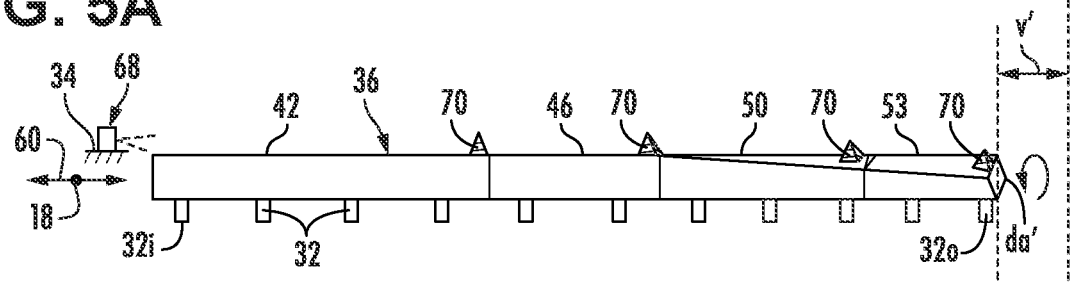
FIG. 5C

SYSTEM AND METHOD FOR AN AGRICULTURAL MACHINE

FIELD

The present disclosure generally relates to agricultural machines and, more particularly, to systems and methods for a boom assembly of the agricultural machine.

BACKGROUND

Various types of machines utilize applicators (e.g., sprayers, floaters, etc.) to deliver an agricultural product to a ground surface of a field. The agricultural product may be in the form of a solution or mixture, with a carrier (such as water) being mixed with one or more active ingredients (such as an herbicide, agricultural product, fungicide, a pesticide, or another product).

The applicators may be pulled as an implement or self-propelled and may include a tank, a pump, a boom assembly, and a plurality of nozzles carried by the boom assembly at spaced locations. The boom assembly may include a pair of boom arms, with each boom arm extending to either side of the applicator when in an unfolded state. Each boom arm may include multiple boom sections, each with a number of spray nozzles (also sometimes referred to as spray tips).

During an application operation, however, various factors may affect a quality of the application of the agricultural product to the field. For instance, boom arm deflection of the boom assembly while the vehicle moves along the field may lead to inconsistent application of the agricultural product.

Accordingly, an improved system and method for monitoring the quality of application of the agricultural product to the field by monitoring deflection (i.e., movement) of the boom assembly would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to an agricultural system that includes a boom assembly including a frame section, and a boom section pivotably coupled to the frame section. One or more nozzle assemblies is operably coupled with the boom assembly. A boom movement sensor has a field of view directed along a portion of a length of the boom section and is configured to generate image data. A machine sensor is configured to generate machine data. A computing system is communicatively coupled to the boom movement sensor and the machine sensor. The computing system is configured to determine an estimated boom position of the boom section based at least in part on the machine data, determine a position of a target within the image data based at least in part on the estimated boom position of the boom section, modify the image data based on the position of the target to create modified image data, and determine a magnitude of deflection based on the modified image data.

In some aspects, the present subject matter is directed to an agricultural method for determining a magnitude of deflection of a boom assembly. The method includes determining, with a computing system, an estimated boom position of a boom section. The method also includes receiving, with the computing system, image data generated by a boom movement sensor having a field of view directed along a portion of a length of a boom section. In addition, the method includes determining, with the computing system, a position of a target within the image data based at least in part on the estimated boom position of the boom section. The method further includes modifying, with the computing system, the image data based on the position of the target to create modified image data. Lastly, the method includes determining, with the computing system, a magnitude of deflection based on the modified image data.

In some aspects, the present subject matter is directed to an agricultural system that includes a boom assembly including a frame section and a boom section pivotably coupled to the frame section. A computing system is configured to receive historical data of a position of the boom assembly from a machine database and determine a magnitude of deflection of the boom assembly based in part on the historical data.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIGS. 4A-4C illustrate simplified, schematic perspective views of a boom arm of a boom assembly in accordance with aspects of the present subject matter;

FIGS. 5A-5C illustrate simplified, schematic rear views of a boom arm of a boom assembly in accordance with aspects of the present subject matter;

Figure 1:
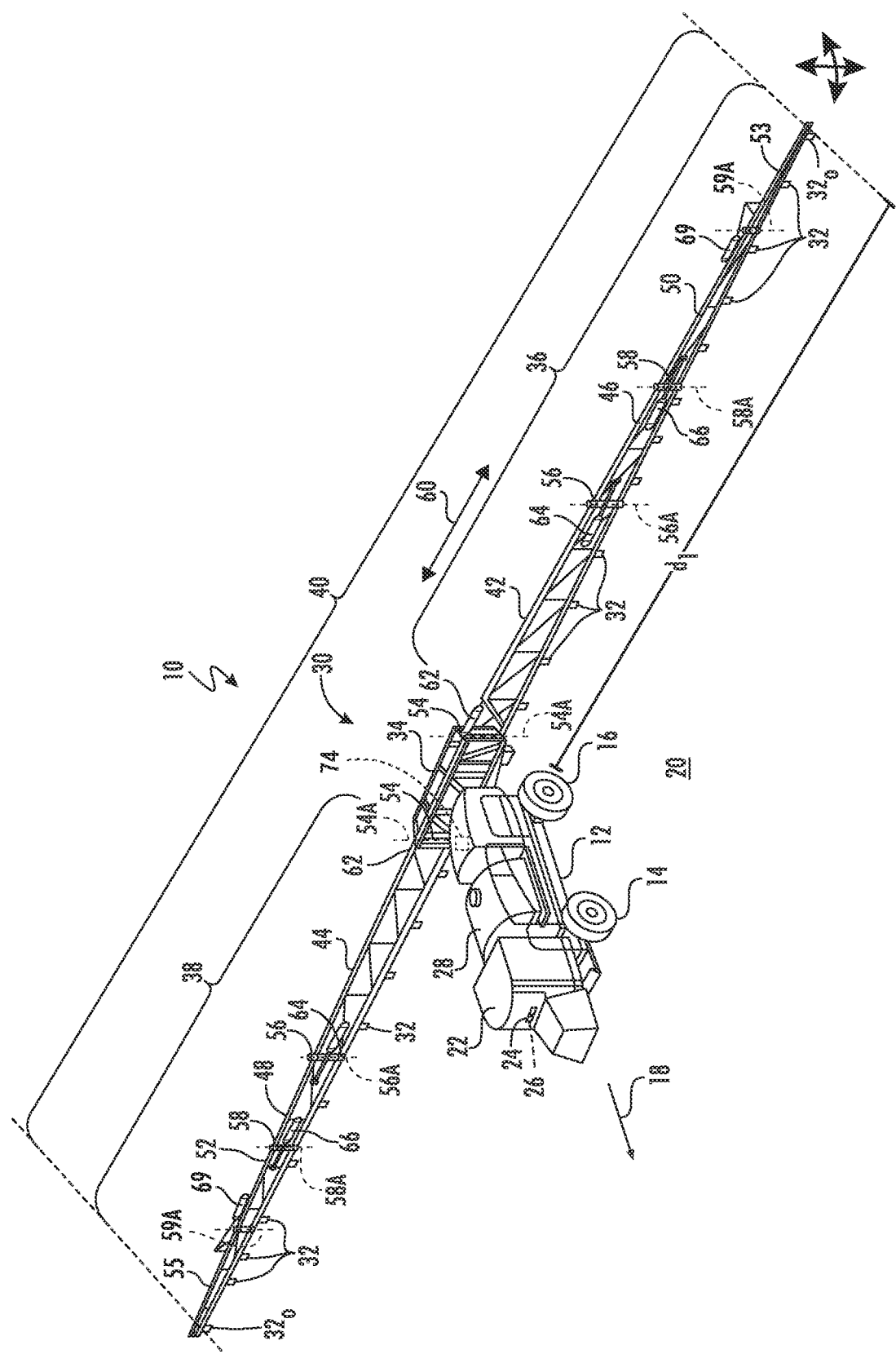
FIG. 1 illustrates a perspective view of an agricultural machine in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations may be made in the present disclosure without departing from the scope or spirit of the disclosure. For instance, features illustrated or described as part may be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected" or "operably coupled" to each other to achieve the desired functionality, and any two components capable of being so associated may also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items may be employed by itself, or any combination of two or more of the listed items may be employed. For example, if a composition or assembly is described as containing components A, B, and/or C, the composition or assembly may contain A alone; B alone; C alone; A and B in combination; A and C in combination; B and C in combination; or A, B, and C in combination.

In general, the present subject matter is directed to an agricultural system that can include a boom assembly including a frame section and a boom section pivotably coupled to the frame section. One or more nozzle assemblies may be operably coupled with the boom assembly. A boom movement sensor may be configured to generate image data and a machine sensor may be configured to generate machine data.

A computing system may be communicatively coupled to the sensor. The computing system may be configured to determine an estimated boom position of the boom section based at least in part on the machine data, determine a position of a target within the image data based at least in part on the estimated boom position of the boom section, modify the image data based on the position of the target to create modified image data, and determine a magnitude of deflection based on the modified image data.

By modifying the sensor data, the sensor data may be more uniform than the image data received directly from the boom movement sensor. Such uniformity in proportions in relation to the target and image quality (e.g. contrast, noise, etc.) may provide for the computing system to improve the successful identification of the target in the sensor data. Additionally or alternatively, the modified sensor data may be reduced in size which can allow for reduced computing resources and/or processing time. Moreover, in some cases, the modified sensor data may be augmented by various techniques including, but not limited to, flipping, rotating, translating, scaling, color enhancing, histogram stretching, noise filtering, selective noise inclusion, etc. to further enhance the processing capabilities of the sensor data.

Figure 2:
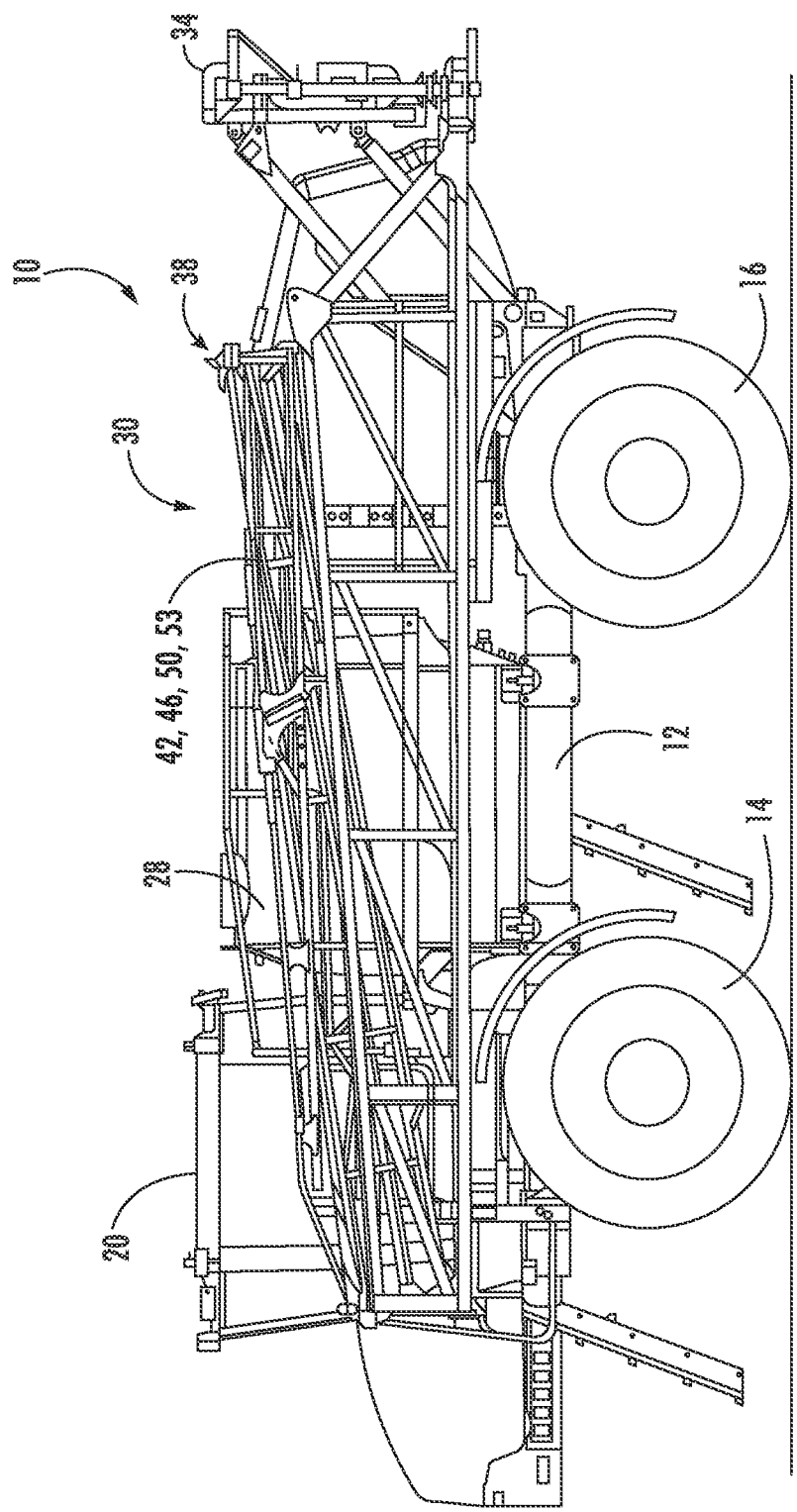
FIG. 2 illustrates a side view of the machine shown in FIG. 1 in accordance with aspects of the present subject matter.

Referring now to FIGS. 1 and 2, a machine 10 is generally illustrated as a self-propelled agricultural applicator. However, in alternate embodiments, the machine 10 may be configured as any other suitable type of machine 10 configured to perform agricultural application operations, such as a tractor or other machine configured to haul or tow an application implement.

In various embodiments, the machine 10 may include a chassis 12 configured to support or couple to a plurality of components. For example, front and rear wheels 14, 16 may be coupled to the chassis 12. The wheels 14, 16 may be configured to support the machine 10 relative to a ground surface and move the machine 10 in a forward direction of travel as indicated by arrow 18 in FIG. 1 (the direction of forward travel may be parallel to a fore-aft direction) across a field 20 or the ground surface. In this regard, the machine 10 may include a power plant, such as an engine, a motor, or a hybrid engine-motor combination, and a transmission configured to transmit power from the engine to the wheels 14, 16.

The chassis 12 may also support a cab 22, or any other form of operator's station, which provides various control or input devices (e.g., levers, pedals, control panels, buttons, and/or the like) for providing various notifications to an operator and/or permitting the operator to control the operation of the machine 10. For instance, as shown in FIG. 1, the machine 10 may include a user interface 24, e.g. a human-machine interface (HMI), for displaying messages and/or alerts to the operator and/or for allowing the operator to interface with the machine's controller through the one or more user interfaces 24. For instance, the HMI may include any suitable output devices (e.g., screens, audio output devices, lights, haptic devices, and/or the like) for providing messages and/or alerts to an operator. Similarly, the HMI 24 may have one or more user-input devices (e.g., screens, levers, pedals, control panels, buttons, audio input devices, keyboards, keypads, and/or the like) within the cab 22 and/or in any other practicable location.

The chassis 12 may also support one or more tanks 28 and a boom assembly 30. The one or more tanks 28 may be generally configured to store or hold an agricultural product, such as a pesticide, a fungicide, a rodenticide, a fertilizer, a nutrient, and/or the like. The agricultural product stored in the one or more tanks 28 may be dispensed onto the underlying field 20 (e.g., plants and/or soil) through one or more nozzle assemblies 30 mounted on the boom assembly 30 (and/or the machine 10).

Figure 7:
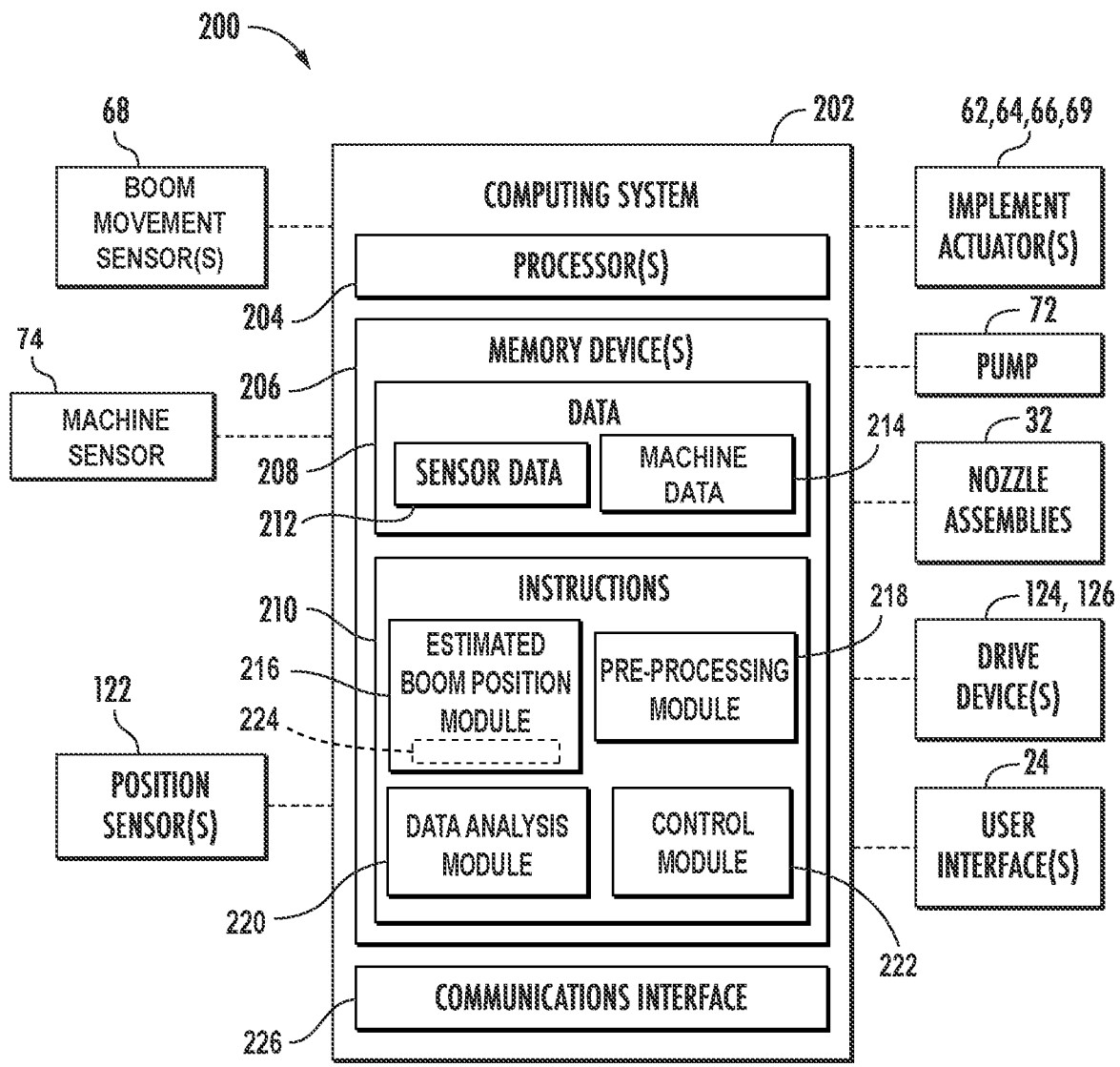
FIG. 7 illustrates a schematic view of a system for monitoring a boom assembly of an agricultural machine in accordance with aspects of the present subject matter.

In general, each nozzle assembly 32 is configured to dispense an agricultural product stored within an associated tank (e.g., product tank 28) onto the underlying field 20 and/or plants by a pump 72 (FIG. 7). In this regard, each nozzle assembly 32 may include a nozzle valve and an associated spray tip or spray nozzle. In several embodiments, the operation of each nozzle valve may be individually controlled such that the valve regulates the flow rate of the agricultural product through the associated nozzle assembly 32, and thus, the flow rate of the agricultural product dispensed from the respective spray nozzle. Such control of the operation of the nozzle valve may also be used to achieve the desired spray characteristics for the output or spray fan expelled from the associated spray nozzle, such as a desired droplet size and/or spray pattern. For instance, the nozzle valve may be configured to be pulsed between open/closed positions relative to an orifice of the adjacent spray nozzle at a given frequency and duty cycle (e.g., using a pulse width modulation (PWM) technique) to achieve the desired flow rate and spray characteristics for the respective nozzle assembly 32.

As shown in FIGS. 1 and 2, the boom assembly 30 may include a boom frame section 34 that supports first and second boom arms 26, 38 in a cantilevered nature. The first and second boom arms 36, 38 are generally movable between an operative or unfolded position (FIG. 1) and an inoperative or folded position (FIG. 2). When distributing the agricultural product, the first and/or second boom arm 36, 38 extends laterally outboard from the machine 10 to cover wide swaths of soil, as illustrated in FIG. 1. When extended, each boom arm 36, 38 defines a first lateral length or distance $d_1$ defined between the frame section 34 and an outer nozzle assembly $32_o$ and/or an outer end portion of the boom arms 36, 38. Further, the boom arms 36, 38, when both unfolded, define a field swath 40 between the respective outer nozzle assemblies $32_o$ of the first and second boom arms 36, 38 that is generally commensurate with an area of the field 20 to which the agricultural machine 10 covers during a pass across a field 20 to perform the agricultural operation. However, a single boom arm 36, 38 may be utilized during the application operation. In such instances, the field swath 40 may be an area defined between a pair of nozzle assemblies 32 of the single boom arm 36, 38 that are furthest from one another in the lateral direction 60.

Each boom arm 36, 38 of the boom assembly 30 may generally include one or more wing sections or "boom sections." For instance, in the illustrated example, the first boom arm 36 includes three boom sections, namely a first inner boom section 42, a first middle boom section 46, and a first outer boom section 50. Similarly, the second boom arm 38 includes three boom sections, namely a second inner boom section 44, a second middle boom section 48, and a second outer boom section 52. In such examples, the first and second inner boom sections 42, 44 may be pivotably coupled to the frame section 34 at pivot joints 54. Similarly, the first and second middle boom sections 46, 48 may be pivotably coupled to the respective first and second inner boom sections 42, 44 at pivot joints 56, while the first and second outer boom sections 50, 52 may be pivotably coupled to the respective first and second middle boom sections 46, 48 at pivot joints 58. In some instances, each boom arm 36, 38 of the boom assembly 30 may additionally include a breakaway boom section, such as a first breakaway boom section 53 of the first boom arm 36 and a second breakaway boom section 55 of the second boom arm 38, where the first and second breakaway boom sections 53, 55 are pivotably coupled to the respective first and second outer boom sections 50, 52 at pivot joints 59. As is generally understood, pivot joints 54, 56, 58, 59 may be configured to allow relative pivotal motion between the adjacent boom sections of each boom arm 36, 38. For example, the pivot joints 54, 56, 58, 59 may allow for articulation of the various boom sections between the fully extended or working position (e.g., as shown in FIG. 1), in which the boom sections are unfolded along a lateral direction 60 of the boom assembly 30 to allow for the performance of an agricultural spraying operation, and the transport position (FIG. 2), in which the boom sections are folded inwardly to reduce the overall width of the boom assembly 30 along the lateral direction 60.

Moreover, as shown in FIG. 1, the boom assembly 30 may include actuators to enable pivoting or folding of the boom arms 36, 38. For instance, the boom assembly 30 may include inner fold actuators 62 coupled between the inner boom sections 42, 44 and the frame section 34 to enable pivoting or folding of the inner boom section 42, 44 relative to the frame section 34 about a pivot axis 54A defined by the pivot joints 54 between a plurality of angles in a fore-aft direction. Additionally, the boom assembly 30 may also include middle fold actuators 64 coupled between each inner boom section 42, 44 and its adjacent middle boom section 46, 48, outer fold actuators 66 coupled between each middle boom section 46, 48 and its adjacent outer boom section 50, 52, and/or breakaway fold actuators 69 coupled between each outer boom section 50, 52 and its adjacent breakaway boom section 53, 55. As such, by retracting/extending the middle fold actuators 64, the outer fold actuators 66, and the breakaway fold actuators 69, each middle, outer, and breakaway boom section 46, 48, 50, 52, 53, 55 may be pivoted or folded relative to its respective inwardly adjacent boom section 42, 44, 46, 48 about a respective pivot axis 56A, 58A, 59A.

When moving to the transport position, the boom assembly 30 and fold actuators 62, 64, 66, 69 may be oriented such that the pivot axes 54A, 56A, 58A, 59A are generally parallel to the vertical direction and, thus, the various boom sections 42, 44, 46, 48, 50, 52, 53, 55 of the boom assembly 30 are configured to be folded horizontally (e.g., parallel to the lateral direction 60) about the pivot axes 54A, 56A, 58A, 59A. However, some or all of the pivot axes 54A, 56A, 58A, 59A may be oriented in any other suitable direction. In addition, although each boom arm 36, 38 is shown in FIGS. 1 and 2 as including four individual boom sections coupled along opposed sides of the central boom section, each boom arm 36, 38 may generally have any suitable number of boom sections.

Figure 3:
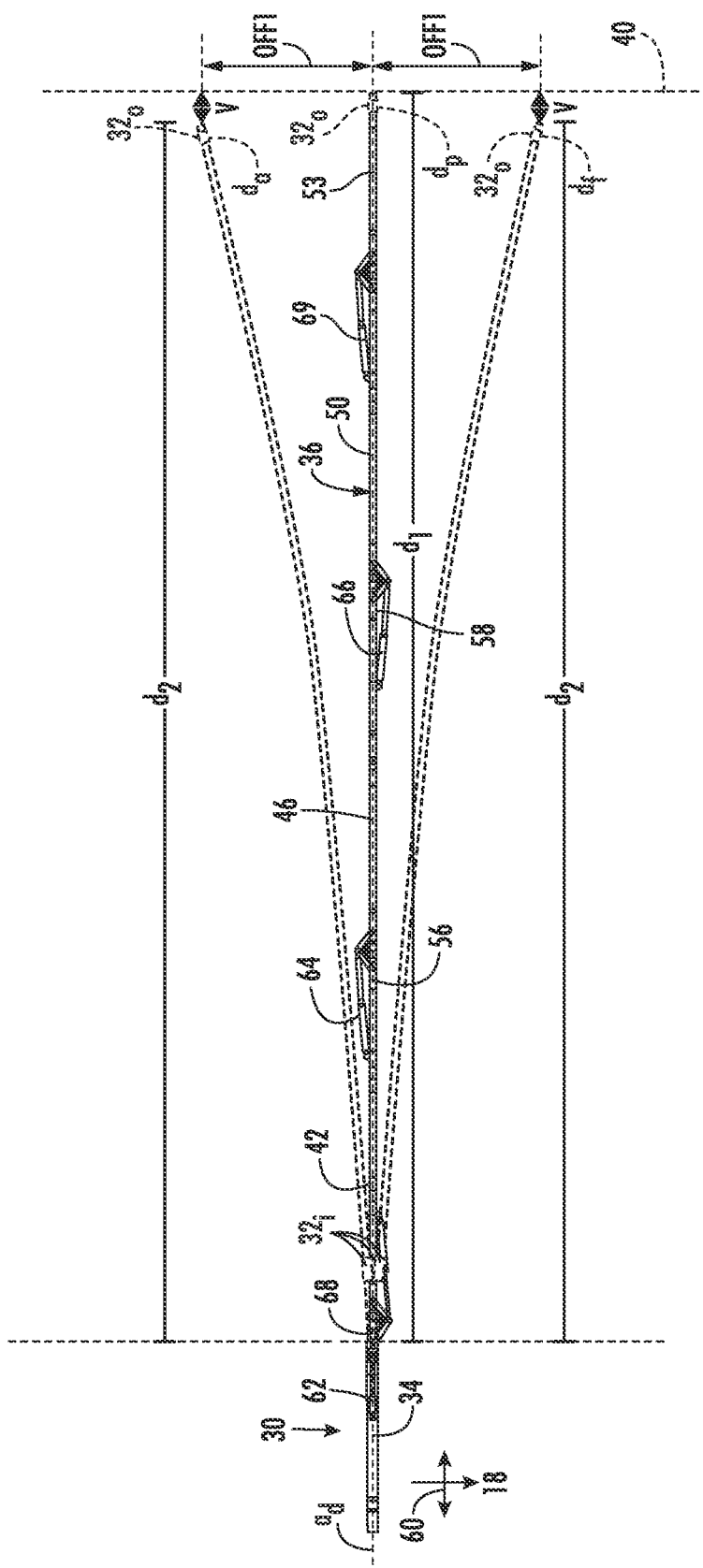
FIG. 3 illustrates a simplified, schematic top-down view of a boom arm of a boom assembly in accordance with aspects of the present subject matter.

Referring now to FIG. 3, a simplified, schematic top-down view of some embodiments of a boom arm of a boom assembly 30 (e.g., the boom arm 36 of the boom assembly 30) is illustrated in accordance with aspects of the present subject matter, particularly illustrating the boom arm in an expected position (e.g., in solid lines) and being deflected in a forward and a rearward direction (e.g., both shown in dashed lines). It will be appreciated that, while only the boom arm 36 and the frame section 34 are shown in FIG. 3, the other boom arm 38 may be positioned in a mirrored orientation to boom arm 36 about the frame section 34 (FIGS. 1 and 2) and/or in any other position/orientation.

In various instances, each boom arm 36, 38 may extend in a default position $d_p$, like boom arm 36 shown in solid lines in FIG. 3, along the first lateral distance $d_1$ away from the machine 10 and/or the frame section 34 along a default axis $a_d$. In various examples, the default axis $a_d$ may generally be offset ninety degrees relative to the vehicle travel direction such that the default axis $a_d$ is generally aligned with the lateral direction 60. During operation, however, various forces may be placed on the boom assembly 30 causing the boom arms 36, 38 and, consequently, the nozzle assemblies 32 positioned along the boom arms 36, 38, to be deflected or repositioned relative to the frame section 34 and/or the machine 10. For instance, a portion of the boom assembly 30 may be deflected from an assumed or a default position $d_p$ due to high dynamic forces encountered when the machine 10 is turned, accelerated, or decelerated. In addition, terrain variations and weather variances may also cause deflection of the boom assembly 30. Further, a portion of the boom assembly 30 may come in contact with an object, thereby leading to the magnitude of the deflection of the boom assembly 30.

The boom arm 36 may be deflected from its default position $d_p$ in a forward direction (e.g., the direction of travel 18) into a forward deflected position $d_f$ or, alternately, in an aft direction opposite the direction of travel 18, into an aft deflected position $d_a$, as generally illustrated in FIG. 3. In the deflected positions $d_f$, $d_a$, the outer nozzle assembly $32_o$ may be positioned a second lateral distance $d_2$ from the frame section 34, which may be less than the first lateral distance $d_1$ due to a curvature of the boom assembly 30. Accordingly, a lateral variance v in the lateral direction 60 is formed between the first and second lateral distances $d_1$, $d_2$. This lateral variance v may lead to a misapplication of an agricultural substance to the underlying field 20, which may be in the form of an overapplication or an underapplication of the agricultural product. For instance, the area of the underlying field 20 between the frame section 34 and the outer nozzle assembly $32_o$ may have an overapplication of the agricultural product applied thereto when the boom arm 36 is deflected, while the portion of the underlying field 20 below the variance v may have an underapplication of the agricultural product applied thereto. In addition to creating the lateral variance v, the magnitude of the deflection of the boom arm 36 also creates an offset OFF1 between the outer nozzle assembly $32_o$ in the default position $d_p$ and the deflected positions $d_f$, $d_a$ along the direction of travel 18, which may also lead to inaccuracies during application of the agricultural product to the underlying field 20, as the deflected nozzles (including the outer nozzle assembly $32_o$) are at a different position in the field than expected.

In examples in which the boom arm 36 is supported by the frame section 34 in a cantilevered orientation (or any other non-uniform orientation), an outer nozzle assembly $32_o$ may have a greater deflection magnitude from its default position $d_p$ than an inner nozzle assembly $32_i$. Once the deflective force is overcome and/or no longer present, the boom arm 36 may move back towards its default position $d_p$. In some embodiments, the magnitude of the deflection of the boom arm 36 may generally occur as harmonic oscillations across the default axis $a_d$ such that the boom arm 36 may move from a position at least partially aft of the default axis $a_d$ to the default position $d_p$ and then to a position at least partially fore of the default position $d_p$ and so on. During the oscillations, an acceleration of an inner nozzle assembly $32_i$ will be less than the outer nozzle assembly $32_o$ due to the varied deflection magnitudes along the boom arm 36.

Figure 6:
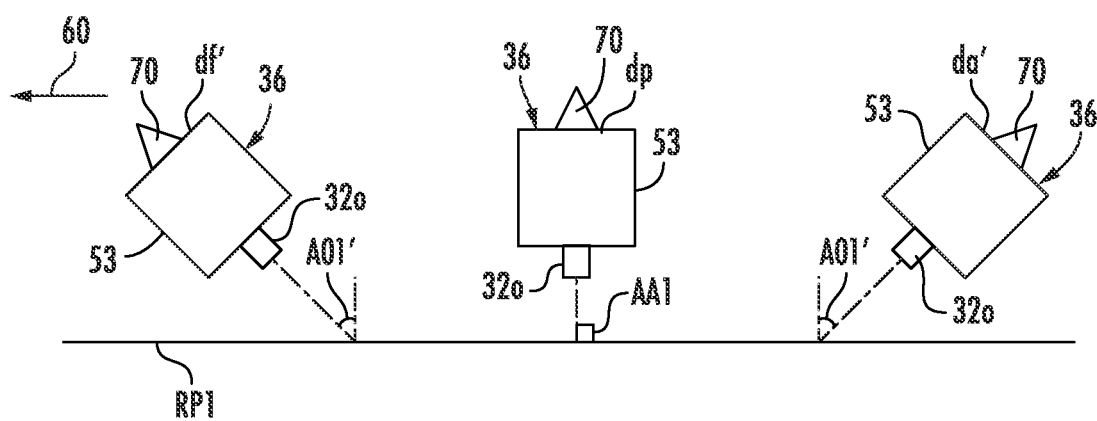
FIG. 6 illustrates a simplified, schematic section view of a portion of a boom arm of a boom assembly in accordance with aspects of the present subject matter taken with reference to section line VI-VI across FIGS. 4A-4C.

In some instances, depending on the speed of the deflection in the fore direction (e.g., the forward direction of travel 18) or the aft direction (e.g., opposite the forward direction of travel 18) and depending on the configuration of the boom arms 36, 38 (e.g., the lengths $d_1$ of the boom arms 36, 38), the boom arms 36, 38 may additionally experience pitch. With reference to FIGS. 4A-5C, when the boom arm 36 moves from the default position $d_p$ shown in FIGS. 4A and 5A with the forward direction of travel 18 to a forward deflected position $d_f'$ shown in FIGS. 4B and 5B or, alternately, against or opposite the direction of travel 18 to an aft deflected position $d_a'$ shown in FIGS. 4C and 5C, one or more of the boom sections 42, 46, 50, 53 of the boom arm 36 pivot relative to each other in addition to pitching to varying degrees. For instance, in the examples shown in FIGS. 4B and 5B, the boom arm 36 pitches about the length of the boom arm 36 such that the upper surface of the boom arm 36 is pivoted forward along the forward direction of travel 18. Conversely, in the examples shown in FIGS. 4C and 5C, the boom arm 36 pitches about the length of the boom arm 36 such that the upper surface of the boom arm 36 is pivoted aft, opposite the direction of travel 18. Generally, as the boom arms 36, 38 pitch, the nozzle assemblies 32' positioned on the pitching portions of the boom arms 36, 38 also pitch. For instance, as particularly shown in FIG. 6, the outer nozzle assembly $32_o$ is at a first angle of attack AA1 relative to a reference plane (e.g., field surface, crop canopy, etc.) when the boom arm 36 is in the default position $d_p$ and is offset from the first angle of attack AA1 by an angular offset AO1' when pitched to the deflected and pitched positions $d_f'$, $d_a'$.

The outer boom sections may generally deflect about their length (i.e., pitch) with a greater magnitude than the next outermost sections. For instance, in the examples illustrated in FIGS. 4B-4C and 5B-5C, the breakaway boom section 53 pitches a greater amount along its length than the outer boom section 50, the outer boom section 50 pitches a greater amount along its length than the middle boom section 46, and the middle boom section 46 pitches a greater amount along its length than the inner boom section 42. As such, the outer nozzle assembly $32_o$ (FIGS. 5A-5C) will have a greater deflection magnitude (e.g., the angular offset AO1') from its default position $d_p$ than the inner nozzle assembly $32_i$ (FIGS. 5A-5C). Further, as shown in FIGS. 4B-4C and 5B-5C, the pitch along the length of each of the boom sections 42, 46, 50, 53 may vary (e.g., generally increase) from the inner end to the outer end. For instance, the outer end of the breakaway section 53 (and the outer nozzle assembly $32_o$), pitches more than the inner end of the breakaway section 53 (and the next inward nozzle assembly 32 on the breakaway section 53), the outer end of the outer boom section 50 (and the outer nozzle assembly 32 on the outer boom section 50) pitches more than the inner end of the outer boom section 50 (and the next inward nozzle assembly(ies) 32 on the outer boom section 50), and so forth. In some cases, the variation in pitch may be linear or non-linear. In addition, in some instances, a variation v' (FIGS. 5A-5C) in the lateral direction 60 may be experienced between the outer nozzle 32o in the default position $d_p$ and the deflected positions $d_f'$, $d_a'$ when there is both fore-aft pivoting and pitching. The variation v' may be equal to or different from the variation v (FIG. 3) in the lateral direction 60 experienced when there is only fore-aft pivoting. In addition to creating the lateral variance v', the combined deflection and pitching of the boom arm 36 also creates an offset OFF1' between the outer nozzle assembly $32_o$ in the default position $d_p$ and the deflected positions $d_f'$, $d_a'$ along the direction of travel 18. The offset OFF1' may be equal to or different from the offset OFF1 (FIG. 3) along the direction of travel 18 experienced when there is only fore-aft pivoting.

Generally, when the boom arm 36 is pivoting and pitching towards one of the deflected positions $d_f'$, $d_a'$, the boom sections (and associated nozzles 32) have varying acceleration, with the outermost boom section (e.g., the breakaway boom section 53) and its outermost nozzle 32 (e.g., outer nozzle $32_o$) having the highest acceleration relative to the frame section 34 along the direction of travel 18 and the highest acceleration relative to the frame section 34 in the pitching direction (e.g., about its length). The movement into the deflected positions $d_f'$, $d_a'$, and the resulting varying angular offset AO1', lateral variance v', and offset OFF1', may lead to a misapplication of an agricultural substance to the underlying field 20, which may be in the form of an overapplication or an underapplication of the agricultural product. For instance, the area of the underlying field 20 between the frame section 34 and the outer nozzle assembly $32_o$ may have an overapplication of the agricultural product applied thereto when the boom arm 36 is deflected and pitched, while the portion of the underlying field 20 below the variance v' may have an underapplication of the agricultural product applied thereto. Similarly, the offsets OFF1' and AO1' between the outer nozzle assembly $32_o$ in the default position $d_p$ and the deflected positions $d_f'$, $d_a'$ may also lead to inaccuracies during application of the agricultural product to the underlying field 20, as the nozzles 32 are not above the area expected for the position of the machine 10 along the direction of travel 18 and are not in a default angular position (e.g., offset from the angle of attack AA1). For instance, the greater the offset from the default angle of attack AA1, the further the spray must travel before reaching the reference plane RP1, which may cause the spray to be dispersed over a less controlled (e.g., wider) area, with less density.

With further reference to FIGS. 4A-6, one or more boom movement sensors 68 may be provided in association with the machine 10 for monitoring the magnitude of the deflection of various portions of the boom assembly 30. For instance, as shown in FIGS. 3-5C, the boom movement sensor 68 may be positioned such that each of the boom movement sensor 68 has a field of view 76 directed along at least a portion of the length $d_1$ of the associated boom arm 36, 38. For example, the boom movement sensor 68 may be supported on one or more of the frame section 34, the inner boom section(s) 42, 44, the middle boom section(s) 46, 48, the outer boom section(s) 50, 52, the breakaway boom section(s) 53, 55, or at any other suitable location on the machine 10. As shown in FIGS. 3-5C, in some instances, the boom movement sensor 68 may be supported on the machine 10 proximate to the inner end of the respective boom arm 36, 38 (e.g., on the frame section 34), such that a majority of the length $d_1$ of the respective boom arm 36, 38 may be within the field of view 76 of the boom movement sensor 68. In some instances, the entire length $d_1$ of the respective boom arm 36, 38 may be within the field of view 76 of the boom movement sensor 68. The boom movement sensor 68 may include one or more cameras (including stereo camera(s), and/or the like), LIDAR sensors (e.g., single and/or multiple frequency LIDAR sensors), and/or the like, that allow the boom movement sensor 68 to generate image data, point-cloud data, and/or any other data that may be indicative of the orientation of the associated the first boom arm 36 and/or the second boom arm 38, at least along the portion of the length $d_1$ of the associated the first boom arm 36 and/or the second boom arm 38.

In some instances, the first boom arm 36 and/or the second boom arm 38 may further be configured to support one or more targets 70. For instance, as shown in FIGS.

4A-6, the one or more targets 70 may be positioned on one or more boom section(s) of the first boom arm 36 and/or the second boom arm 38. For example, the one or more targets 70 may be positioned on each boom section of the first boom arm 36 and/or the second boom arm 38. In some examples, each of the targets 70 is positioned at an end region (e.g., an outer end region) of the respective boom section, such that the end region of each boom section may be more easily identified from the data generated by the boom movement sensor 68. However, the one or more targets 70 may be positioned in any other suitable manner along the first boom arm 36 and/or the second boom arm 38.

In various instances, the one or more targets 70 may be configured to be identifiable in the data generated by the boom movement sensor 68. For instance, the one or more targets 70 may extend outwardly from a surface of the first boom arm 36 and/or the second boom arm 38. However, the one or more targets 70 may extend from any other suitable portion of the first boom arm 36 and/or the second boom arm 38 such that the one or more targets 70 is detectable to the boom movement sensor 68. Further, each of the one or more targets 70 may be asymmetrical in at least one plane of geometry and/or is asymmetrical in color (e.g., in shading, pattern, and/or the like) such that fore-aft pivoting of the boom section(s) and/or pitching of the boom section(s) of the first boom arm 36 and/or the second boom arm 38 may be identified from the one or more targets 70. For example, each of the one or more targets 70 may be asymmetrical in both geometry and coloring. For instance, each of the one or more targets 70 is shown as being generally pyramidal in shape, with adjacent sides having different shadings. However, the one or more targets 70 may have any other suitable geometry and/or coloring. In various examples, the one or more targets 70 may be substantially identical. However, in other examples, the one or more targets 70 may vary in geometry and/or color such that the targets 70 are more easily associated with different positions along the length of the first boom arm 36 and/or the second boom arm 38.

In addition, in some cases, the machine 10 may include one or more machine sensors 74 that are configured to detect one or more settings of the machine 10 (e.g., an operational mode of one or more components of the machine 10, etc.), and/or one or more operating conditions of the machine 10 (e.g., a location of the machine 10, a velocity of the machine 10, a direction of motion of the machine 10, an acceleration of the machine 10, and/or any other parameter of the machine 10).

Referring now to FIG. 7, a schematic view of an agricultural system 200 for monitoring a boom assembly of an agricultural machine is illustrated in accordance with aspects of the present subject matter. In general, the system 200 will be described herein with reference to the machine 10 having the boom assembly 30 as described above with reference to FIGS. 1-6. However, the disclosed system 200 may generally be utilized with any other suitable sprayer or other implement having any other suitable sprayer or implement configuration. Additionally, for purposes of illustration, communicative links or electrical couplings of the system 200 shown in FIG. 7 are indicated by dashed lines.

In several embodiments, the system 200 may include a computing system 202 and various other components configured to be communicatively coupled to and/or controlled by the computing system 202, such as the boom movement boom movement sensor 68 configured to generate data indicative of deflection of the first boom arm 36 and/or the second boom arm 38 (e.g., pitching movement, fore-aft movement, and/or the like), the one or more machine sensors 74 configured to detect one or more settings of the machine 10 (FIG. 1), the implement actuator(s) (e.g., fold actuator(s) 62, 64, 66, 69, etc.), drive device(s) of the machine 10 (e.g., an engine 124, a transmission 126, etc.), a user interface(s) (e.g., the HMI 24), nozzle assembly(ies) 32 for distributing agricultural product onto a field 20, and/or a pump(s) (e.g., the pump 72) for delivering the agricultural product to the nozzle assemblies 32. As indicated above, the user interface(s) 24 may include, without limitation, any combination of input and/or output devices that allow an operator to provide operator inputs to the computing system 202 and/or that allow the computing system 202 to provide feedback to the operator, such as a keyboard, keypad, pointing device, buttons, knobs, touch-sensitive screen, mobile device, audio input device, audio output device, and/or any other device. Additionally, the computing system 202 may be communicatively coupled to one or more position sensors 122 configured to generate data indicative of the location of the machine 10, such as a satellite navigation positioning device (e.g., a GPS, a Galileo positioning system, a Global Navigation satellite system (GLONASS), a BeiDou Satellite Navigation and Positioning system, a dead reckoning device, and/or any other practicable device).

In general, the computing system 202 may correspond to any suitable processor-based device(s), such as a computing device or any combination of computing devices. Thus, as shown in FIG. 7, the computing system 202 may generally include one or more processor 204 and associated memory 206 configured to perform a variety of computer-implemented functions (e.g., performing the methods, steps, algorithms, calculations, and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer-readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor 204, including data 208 that may be retrieved, manipulated, created, and/or stored by the processor 204 and instructions 210 that may be executed by the processor 204.

In various examples, the computing system 202 may correspond to an existing computing device for the machine 10 or may correspond to a separate processing device. For instance, the computing system 202 may form all or part of a separate plug-in module that may be installed in operative association with the machine 10 to allow for the disclosed system and method to be implemented without additional software being uploaded onto existing control devices of the machine 10.

In several embodiments, the data 208 may be stored in one or more databases. For example, the memory 206 may include a sensor database 212 for storing data generated by the boom movement sensor 68 and/or the position sensor 122. For instance, each of the boom movement sensor 68 and the position sensor 122 may be configured or controlled by the computing system 202 to continuously or periodically capture (generate) data associated with the magnitude of the deflection of the first boom arm 36 and/or the second boom arm 38. For instance, the data generated by the boom movement sensor 68 may be at least indicative of pitching deflection of one or more boom sections of the first boom arm 36 and/or the second boom arm 38. In some instances, the data generated by the boom movement sensor 68 may also be indicative of fore-aft deflection of one or more boom sections of the first boom arm 36 and/or the second boom arm 38, lateral rolling of one or more boom sections of the first boom arm 36 and/or the second boom arm 38, and/or the like. Additionally, the data from the boom movement sensor 68 may be taken with reference to the position of the machine 10 within the field 20 based on the position data from the position sensor 122. The data transmitted to the computing system 202 from the boom movement sensor 68 may be stored within the sensor database 212 for subsequent processing and/or analysis. As used herein, the term "sensor data 212" may include any suitable type of data received from the boom movement sensor 68 and/or the position sensor 122 that allows for the magnitude of the deflection of the first boom arm 36 and/or the second boom arm 38 to be accurately analyzed including image data, point-cloud data, GPS coordinates, and/or other suitable type of data.

Additionally or alternatively, the memory 206 may include a machine database 214 that is configured to store machine data continuously or periodically captured (generated) by the one or more machine sensors 74 that may be related to one or more settings of the machine 10 (e.g., an operational mode of one or more components of the machine 10, etc.), and/or one or more operating conditions of the machine 10 (e.g., a location of the machine 10, a velocity of the machine 10, a direction of motion of the machine 10, an acceleration of the machine 10, and/or any other parameter of the machine 10). Additionally or alternatively, the machine database 214 may store machine data that is related to boom movement based on one or more characteristics of the machine 10 (e.g., a boom width, a boom model, a kinematic model of a specific boom, a chassis dimension, etc.), which may be inputted through any manner. For instance, the machine database 214 can include historical data of a position of the boom assembly 30, a velocity of the boom assembly 30, a direction of motion of the boom assembly 30, an acceleration of the boom assembly 30, and/or any other parameter that is correlated to the one or more characteristics of the machine 10, the one or more settings of the machine 10, and/or the one or more operating conditions of the machine 10.

The instructions 210 stored within the memory 206 of the computing system 202 may be executed by the processor 204 to implement one or more modules. For example, the processor 204 may execute an estimated boom position module 216 that is configured to determine an estimated boom position of the boom assembly 30, a data pre-processing module 218 that may be configured to alter the sensor data based at least in part on the estimated boom position of the boom assembly 30, a data analysis module 220 that is configured to determine the magnitude of the deflection of the boom assembly 30, and/or a control module 222 configured to control an operation associated with the agricultural machine 10. In some instances, the modules provided herein may allow for a position of the boom assembly 30 to be determined at increased processing rates when compared to systems that determine a position of the boom assembly 30 from raw sensor data.

In general, the estimated boom position module 216 may be configured to receive the machine data (and/or the sensor data) and, in turn, determine an estimated position of the boom assembly 30 (and consequently the target 70) based on the comparison. In various examples, the estimated boom position module 216 may implement one or more models 224, which may be machine-learned models, for determining the estimated boom position. For example, the machine-learned model may be a machine-learned position generation model configured to receive input data (e.g., the sensor data and/or the machine data) and process the input data to determine the estimated boom position. In some examples, the position generation model may be or include a linear regression model. A linear regression model may be used to intake the input data and provide an intermittent or continuous output for the estimated boom position. Linear regression models may rely on various techniques, such as ordinary least squares, ridge regression, lasso, gradient descent, and/or the like. However, in other examples, the position generation model may be or include any other suitable linear machine-learned model.

Alternatively, the position generation model may correspond to a non-linear machine-learned model. For instance, the position generation model may be or include a neural network such as, for example, a convolutional neural network. Example neural networks include feed-forward neural networks, recurrent neural networks (e.g., long short-term memory recurrent neural networks), convolutional neural networks, transformer neural networks (or any other models that perform self-attention), or other forms of neural networks. Neural networks can include multiple connected layers of neurons and networks with one or more hidden layers, which can be referred to as "deep" neural networks. In some instances, at least some of the neurons in a neural network include non-linear activation functions.

As further examples, the position generation model can be or can otherwise include various other machine-learned models, such as a support vector machine; one or more decision-tree based models (e.g., random forest models); a Bayes classifier; a K-nearest neighbor classifier; and/or other types of models including both linear models and non-linear models.

Figure 8A:
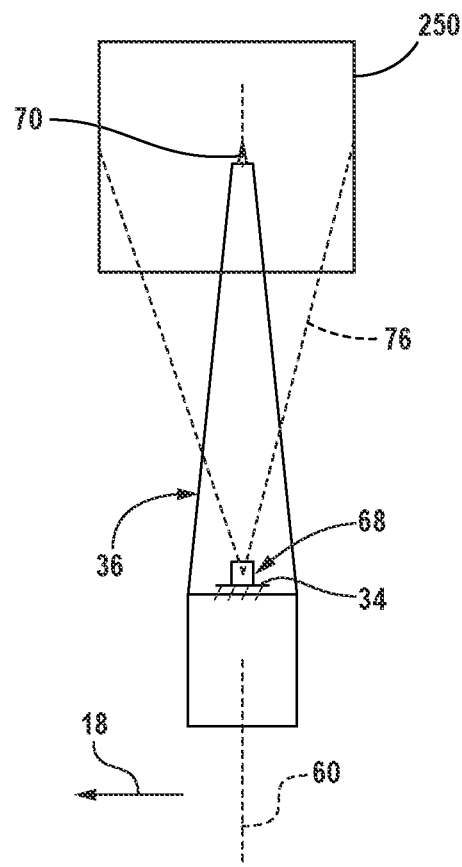
FIG. 8A illustrates a simplified, schematic perspective view of a boom arm of a boom assembly in a first position in accordance with aspects of the present subject matter.
Figure 8B:
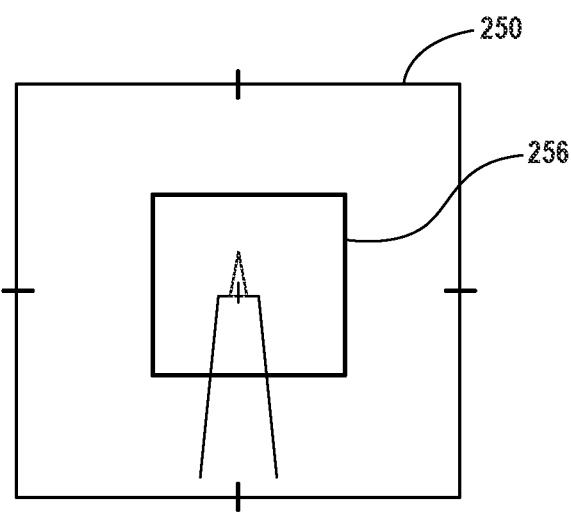
FIG. 8B illustrates an image frame including data related to a position of the boom arm of the boom assembly in the first position in accordance with aspects of the present subject matter.
Figure 9A:
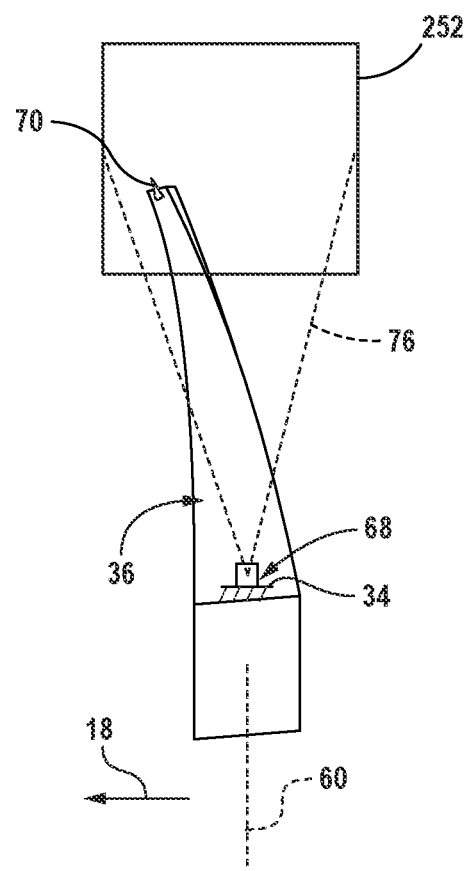
FIG. 9A illustrates a simplified, schematic perspective view of the boom arm of the boom assembly in the second position in accordance with aspects of the present subject matter.
Figure 9B:
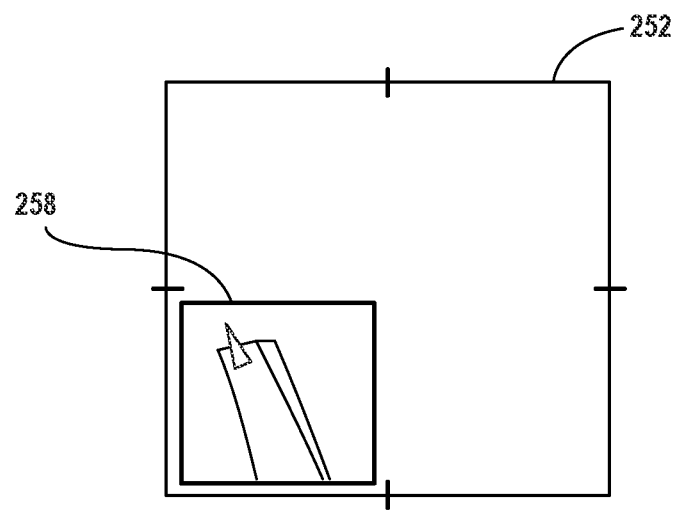
FIG. 9B illustrates an image frame including data related to a position of the boom arm of the boom assembly in the second position in accordance with aspects of the present subject matter.
Figure 10A:
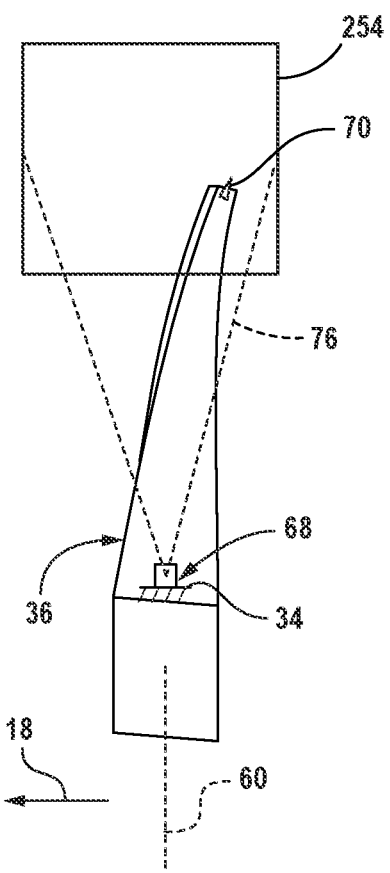
FIG. 10A illustrates a simplified, schematic perspective view of the boom arm of the boom assembly in a third position in accordance with aspects of the present subject matter.
Figure 10B:
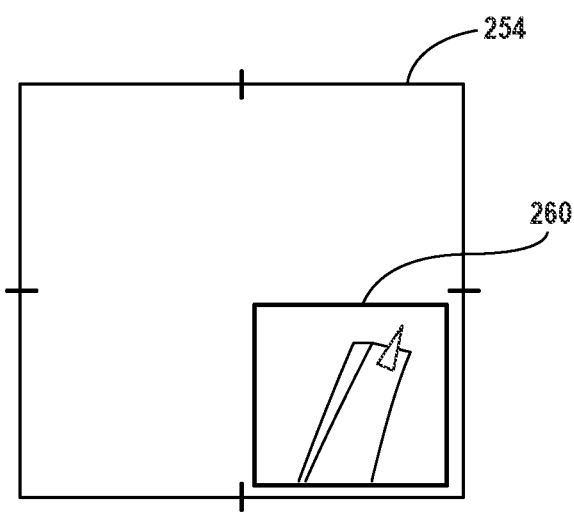
FIG. 10B illustrates an image frame including data related to a position of the boom arm of the boom assembly in the third position in accordance with aspects of the present subject matter.

In some examples, the processor 204 may additionally or alternatively execute a data pre-processing module 218. In general, the data pre-processing module 218 may modify, alter, and/or adjust the raw sensor data before additional analysis or processing by the processor 204. For instance, in examples in which the sensor data is in the form of image data, sequentially captured image frames 250, 252, 254 may be generated by the boom movement sensors 68 and provided to the computing system 202. For example, as illustrated in FIG. 8A, at a first time, the boom arm 36 may be positioned in the default position. As illustrated in FIGS. 8A and 8B, at such time, the boom movement sensor 68 may capture a first image frame 250 that includes at least a portion of the boom arm 36 and/or one or more targets 70. As illustrated in FIG. 9A, at a second time, the boom arm 36 may be positioned fore of the default position. As illustrated in FIGS. 9A and 9B, at such time, the boom movement sensor 68 may capture a second image frame 252 that includes at least a portion of the boom arm 36 and/or one or more targets 70. Similarly, as illustrated in FIG. 10A, at a third time, the boom arm 36 may be positioned aft of the default position. As illustrated in FIGS. 10A and 10B, at such time, the boom movement sensor 68 may capture a third image frame 254 that includes at least a portion of the boom arm 36 and/or one or more targets 70. As shown, the position of the target 70 within the first image frame 250 is varied from the position of the target 70 within the second image frame 252 and the position of the target 70 within the third image frame 254. Likewise, the position of the target 70 within the second image frame 252 is varied from the position of the target 70 within the third image frame 254. As such, the pre-processing module 218 may determine an estimated boom position of the target 70 within the image frame 250, 252, 254 based at least in part on an estimated boom position that is determined by the estimated boom position module 216.

Additionally, the pre-processing module 218 may be configured to crop each image frame 250, 252, 254 based at least in part on the estimated boom position of the target 70 within the image to create a modified image data 256, 258, 260. In various examples, at least twenty-five percent, at least fifty percent, at least seventy-five percent, or any other percentage of the image data may be cropped from the modified image data 256, 258, 260. In some instances, the modified image data 256, 258, 260 may be more uniform than the image data received directly from the boom movement sensor 68. Such uniformity in proportions in relation to the target 70 and image quality (e.g. contrast, noise, etc.) may provide for the computing system 202 to improve the successful identification of the target 70 in the image data. Additionally or alternatively, the modified image data 256, 258, 260 may be reduced in size. Moreover, in some cases, the modified image data 256, 258, 260 may be augmented by various techniques including, but not limited to, flipping, rotating, translating, scaling, color enhancing, histogram stretching, noise filtering, selective noise inclusion, etc.

In some examples, the processor 204 may additionally or alternatively execute a data analysis module 220. In general, the data analysis module 220 may be configured to assess the modified image data 256, 258, 260, e.g., using one or more data analysis or processing techniques, algorithms, and/or the like. For example, the data analysis module 220 may analyze the modified image data 256, 258, 260 using any suitable image processing techniques. Suitable processing or analyzing techniques may include performing spatial analysis on received images or image data. For instance, geometric or spatial processing algorithms, shape detection and/or edge-finding or perimeter-finding algorithms, and/or the like may differentiate the shape, color, edges, and/or the like of the boom arm 36, 38 and/or target(s) 70 from expected features (e.g., plants, residue, soil, rocks, nozzle assemblies along the boom, hoses along the boom, actuators along the boom, and/or the like) in the images. Once the data analysis module 220 determines the target characteristics within modified image data 256, 258, 260, the data analysis module 220 may correlate the location of the cropped modified image data 256, 258, 260 to the full frame of the original image frame (e.g., 250 to 256, 252 to 258, 254 to 260, etc.) to determine the magnitude of the deflection of the first boom arm 36 and/or the second boom arm 38. Similar processing techniques may be used by the data analysis module 220 when the boom movement sensor 68 includes LIDAR sensors to analyze point clouds generated from the sensor data 212.

The instructions 210 stored within the memory 206 of the computing system 202 may also be executed by the processor 204 to implement a control module 222. For instance, the control module 222 be configured to automatically control an operation associated with the agricultural machine 10 based on the deflection (or magnitude of deflection) of the first boom arm 36 and/or the second boom arm 38. For example, when it is determined that the magnitude of deflection of the boom assembly 30 is greater than a threshold magnitude of deflection, the control module 222 may be configured to control an operation associated with the agricultural machine 10. In some instances, the control module 222 may be configured to automatically adjust at least one of a ground speed of the agricultural machine 10 (e.g., by controlling an operation of drive device(s) 124, 126), controlling an operation of the user interface(s) 24 to indicate the variation in the pitch of the boom sections 36, 38, controlling an actuator (e.g., actuator(s) 62, 64, 66, 69) of the boom sections 36, 38 to adjust a position of one or more of the boom section(s) of the boom sections 36, 38, controlling an operation of one or more of the plurality of nozzle assemblies (e.g., valves of the nozzle assembly(ies) 32) and/or associated pump(s) (e.g., pump 72), and/or the like based on the pitch along the first boom arm 36 and/or the second boom arm 38.

Additionally, as shown in FIG. 7, the computing system 202 may also include a communications interface 226 for the computing system 202 to communicate with any of the various other system components described herein. For instance, one or more communicative links or interfaces (e.g., one or more data buses) may be provided between the communications interface 226 and the boom movement sensor 68 and/or the position sensor 122 to allow data transmitted from the boom movement sensor 68 and/or the position sensor 122 to be received by the computing system 202. Similarly, one or more communicative links or interfaces (e.g., one or more data buses) may be provided between the communications interface 226 and the user interface(s) 24 to allow operator inputs to be received by the computing system 202 and to allow the computing system 202 to control the operation of one or more components of the user interface(s) 24. Moreover, one or more communicative links or interfaces (e.g., one or more data buses) may be provided between the communications interface 226 and the implement actuator(s) 62, 64, 66, 69, nozzle assemblies 32 (e.g. valves of the nozzle assemblies 32), pump(s) 72, and/or the drive device(s) 124, 126 to allow the computing system 202 to control the operation of one or more components of such components.

Figure 11:
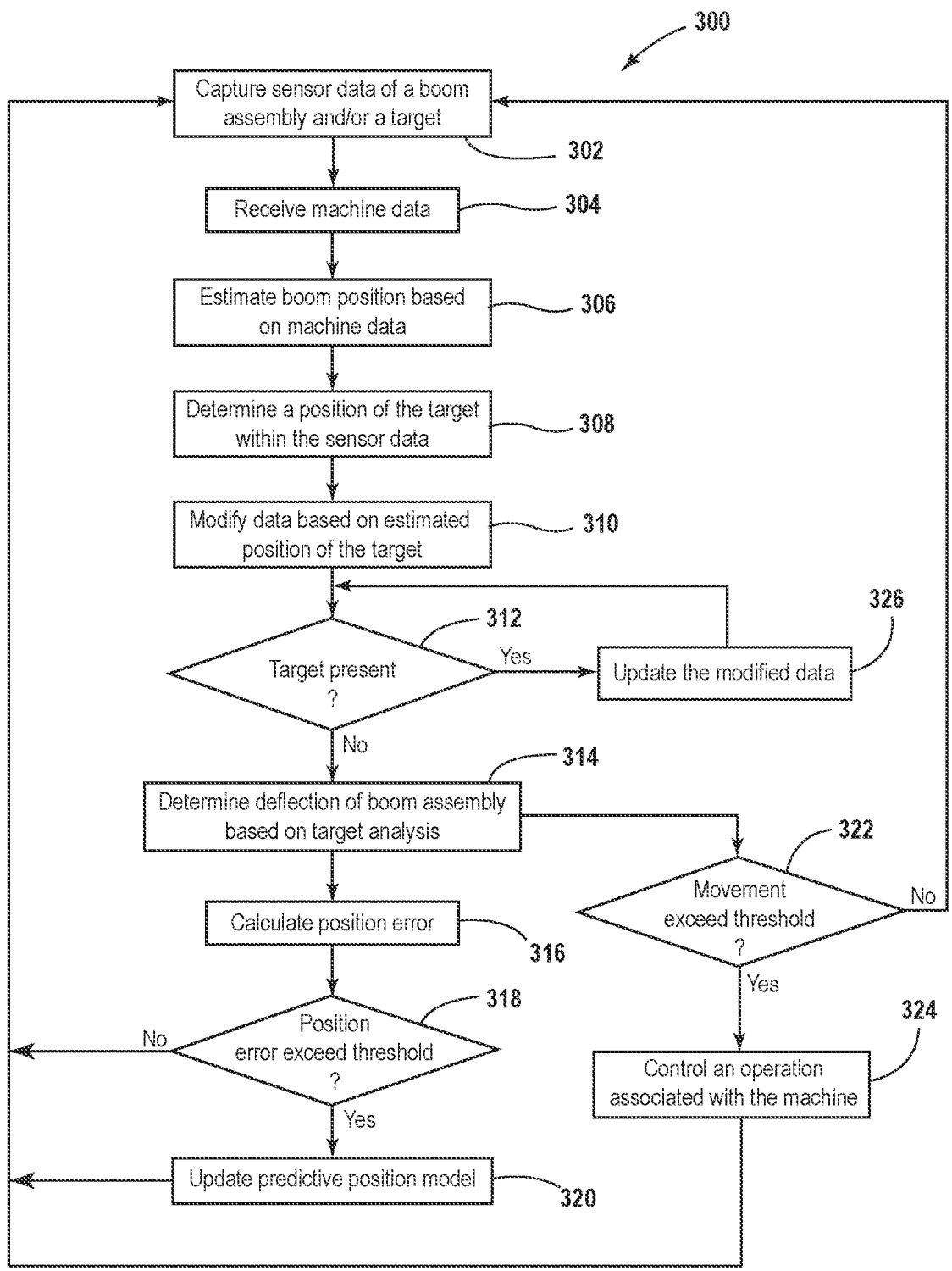
FIG. 11 illustrates a flow diagram providing example control logic for determining the magnitude of the deflection of a boom assembly in accordance with aspects of the present subject matter.
Figure 12:
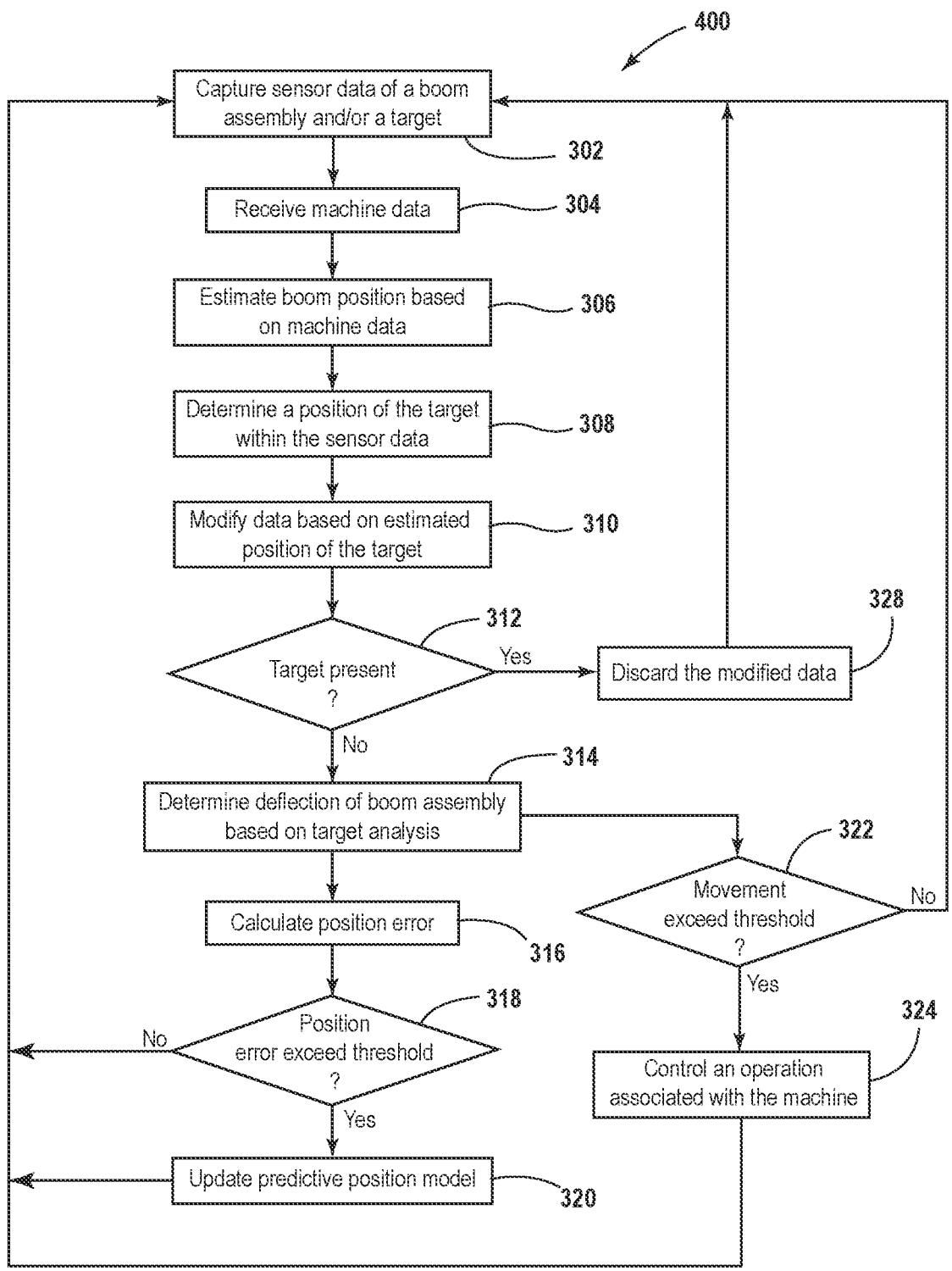
FIG. 12 illustrates a flow diagram providing example control logic for determining the magnitude of the deflection of a boom assembly in accordance with aspects of the present subject matter.

Referring now to FIGS. 11 and 12, flow diagrams of example control logic 300, 400 that may be executed by the system 200 (including the computing system 202 within the system 200 and/or any other suitable computing system) for determining a magnitude of deflection of the boom assembly is illustrated in accordance with aspects of the present subject matter. The control logic 300, 400 shown in FIGS. 11 and 12 is representative of steps of a data processing algorithm that can be executed to determine the magnitude of the deflection of the boom assembly with greater accuracy and without requiring substantial computing resources and/or processing time. Thus, in several embodiments, the control logic 300, 400 may be utilized in association with a system 200 (FIG. 7) installed on or forming part of an agricultural machine to allow for real-time detection of deflection of the boom assembly within a field as the machine is being traversed across the field during the performance of an agricultural operation. In other examples, the control logic 300, 400 may be used in association with any other suitable system, application, and/or the like for determining the magnitude of the deflection of the boom assembly.

As shown in FIGS. 11 and 12, at (302), the control logic 300, 400 can include capturing data of the boom assembly, which may also include a target with a boom movement sensor. The boom movement sensor may include one or more cameras (including stereo camera(s), and/or the like), LIDAR sensors (e.g., single and/or multiple frequency LIDAR sensors), and/or the like, that allow the boom movement sensor to generate image data, point-cloud data, and/or any other data that may be indicative of the orientation of the associated the first boom arm and/or the second boom arm, at least along the portion of the length of the associated the first boom arm and/or the second boom arm.

At (304), the control logic 300, 400 can include receiving machine data. As provided herein, the machine data may be generated or captured by the one or more machine sensors that may be related to one or more settings of the machine (e.g., an operational mode of one or more components of the machine, etc.), and/or one or more operating conditions of the machine (e.g., a location of the machine, a velocity of the machine, a direction of motion of the machine, an acceleration of the machine, and/or any other parameter of the machine). Additionally or alternatively, the machine data may include one or more characteristics of the machine (e.g., a boom width, a boom model, a kinematic model of a specific boom, a chassis dimension, etc.), which may be inputted through any manner.

In turn, at (306), the control logic 300, 400 can include estimating a position of the boom assembly (and consequently the target) based on the machine data. In various examples, the estimated boom position may be determined with the assistance of one or more machine-learned models.

At (308), the control logic 300, 400 can include determining a position of the target within the sensor data. For instance, in examples in which the sensor data is in the form of image data, sequentially captured image frames may be generated by the boom movement sensors and provided to the computing system. In such instances, an estimated boom position of the target within the image frame may be determined based at least in part on an estimated boom position.

At (310), the control logic 300, 400 can include modifying, altering, and/or adjusting the raw sensor data. In some cases, modifying the sensor data can include cropping each image frame based at least in part on the estimated boom position of the target within the image to create a modified image data. In some instances, the modified image data may be more uniform than the image data received directly from the boom movement sensor. Such uniformity in proportions in relation to the target and image quality (e.g. contrast, noise, etc.) may provide for the computing system to improve the successful identification of the target in the image data. Additionally or alternatively, the modified image data may be reduced in size.

At (312), the control logic 300, 400 can include confirming that the target is present in the modified image data based on a variety of image processing techniques (e.g. edge detection, background subtraction, template matching, etc.).

At (314), if the target is present within the modified image data, the control logic 300, 400 can include determining a magnitude of deflection of the boom assembly based on the target characteristics of the modified image data, e.g., using one or more data analysis or processing techniques, algorithms, and/or the like. For example, the data analysis module may analyze the modified image data using any suitable image processing techniques. Suitable processing or analyzing techniques may include performing spatial analysis on received images or image data. For instance, geometric or spatial processing algorithms, shape detection and/or edge-finding or perimeter-finding algorithms, and/or the like may differentiate the shape, color, edges, and/or the like of the boom arm(s) and/or target(s) from expected features in the image frame. Once the data analysis module determines the target characteristics within the modified image data, the data analysis module may correlate the location of the cropped modified image data to the full frame of the original image frame to determine the magnitude of the deflection of the first boom arm and/or the second boom arm of the boom assembly.

At (316), the control logic 300, 400 can include determining a position error between the estimated boom position of the boom assembly, as determined at (306), and the magnitude of the deflection of the boom assembly, as determined at (314). If the position error is equal to or exceeds a defined error threshold, at (318), the control logic 300, 400, at (320), can include updating the predictive position model that is implemented at step (306). If the position error does not exceed the defined error threshold, the control logic 300, 400 can return to (302).

At (322), the control logic 300, 400 can include determining whether a magnitude of deflection of the boom assembly is greater than or equal to a threshold magnitude of deflection. If the magnitude of deflection of the boom assembly, as determined at (314) does exceed the threshold magnitude of deflection, at (324), the control logic can include controlling an operation associated with the agricultural machine. In some instances, the operation associated with the agricultural machine can include adjusting at least one of a ground speed of the agricultural machine, controlling an operation of the user interface(s) to indicate the variation in the pitch of the boom sections, controlling an actuator associated with one or more the boom sections to adjust a position of the boom sections, controlling an operation of one or more of the plurality of nozzle assemblies (e.g., valves of the nozzle assembly(ies)) and/or associated pump(s), and/or any other action. If the magnitude of deflection of the boom assembly, as determined at (314) does exceed the threshold magnitude of deflection, the control logic 300, 400 may return to (302).

With further reference to FIG. 11, if at (312), the target is not present, at (326), the control logic 300 can include updating the modified image data to include the target. For instance, a cropped portion of the modified data may be altered such that a different portion of the image frame is provided as the modified data with the target then present within the modified data.

With further reference to FIG. 12, if at (312), the target is not present, at (328), the control logic 400 can include discarding the modified image data and returning to (302) to analyze a subsequent set of data captured by the boom movement sensor.

Figure 13:
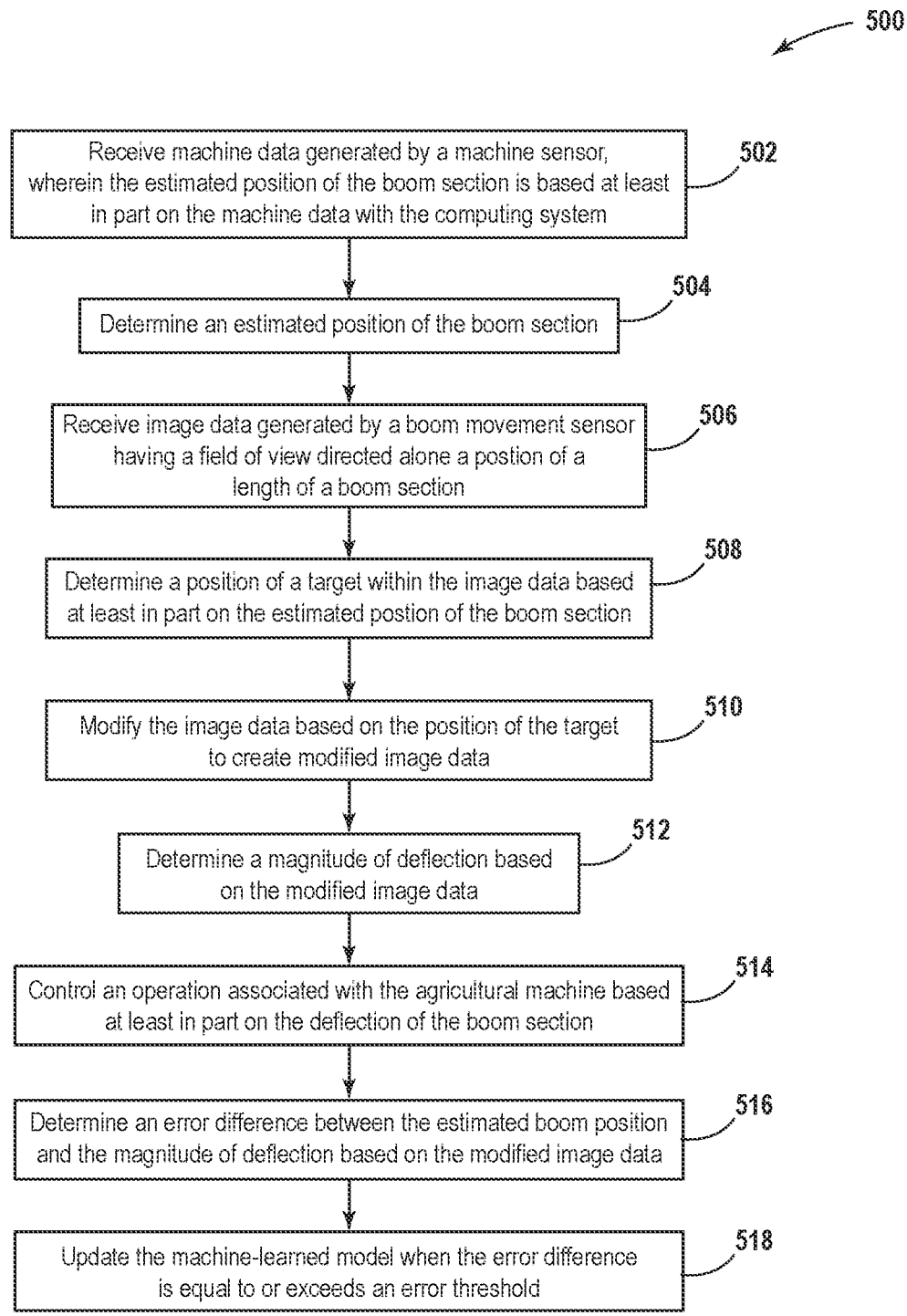
FIG. 13 illustrates a flow diagram of a method for an agricultural application operation in accordance with aspects of the present subject matter.

Referring now to FIG. 13, a flow diagram of a method 500 for determining the magnitude of the deflection of the boom assembly is illustrated in accordance with aspects of the present subject matter. In general, the method 500 will be described herein with reference to the machine 10 described with reference to FIGS. 1-6, as well as the various system components shown in FIG. 7. However, the disclosed method 500 may be implemented with work vehicles and/or implements having any other suitable configurations, and/or within systems having any other suitable system configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein may be omitted, rearranged, combined, and/or adapted in various ways without deviating from the scope of the present disclosure.

As shown in FIG. 13, at (502), the method 500 may include receiving machine data generated by a machine sensor, wherein the estimated boom position of the boom section is based at least in part on the machine data with the computing system. As provided herein, the machine data may be generated or captured by the one or more machine sensors that may be related to one or more settings of the machine (e.g., an operational mode of one or more components of the machine, etc.), and/or one or more operating conditions of the machine (e.g., a location of the machine, a velocity of the machine, a direction of motion of the machine, an acceleration of the machine, and/or any other parameter of the machine). Additionally or alternatively, the machine data may include one or more characteristics of the machine (e.g., a boom width, a boom model, a kinematic model of a specific boom, a chassis dimension, etc.), which may be inputted through any manner.

At (504), the method 500 may include determining an estimated boom position of the boom section with a computing system. As provided herein, the estimated boom position of the boom section may be determined through one or more machine-learned models and/or through any other technique.

At (506), the method 500 may include receiving image data generated by a boom movement sensor having a field of view directed along a portion of a length of a boom section with the computing system. As provided herein, in some examples, sequentially captured image frames may be generated by the boom movement sensors.

At (508), the method 500 can include determining a position of a target within the image data based at least in part on the estimated boom position of the boom section with the computing system. In such instances, an estimated boom position of the target within the image frame may be determined based at least in part on an estimated boom position.

At (510), the method 500 may include modifying the image data based on the position of the target to create modified image data with the computing system. For example, each image frame may be cropped based at least in part on the estimated boom position of the target within the image to create a modified image data. In various examples, at least twenty-five percent, at least fifty percent, at least seventy-five percent, or any other percentage of the image data may be cropped from the modified image data. In some instances, the modified image data may be more uniform than the image data received directly from the boom movement sensor. Such uniformity in proportions in relation to the target and image quality (e.g. contrast, noise, etc.) may provide for the computing system to improve the successful identification of the target in the image data. Additionally or alternatively, the modified image data may be reduced in size. Moreover, in some cases, the modified image data may be augmented by various techniques including, but not limited to, flipping, rotating, translating, scaling, color enhancing, histogram stretching, noise filtering, selective noise inclusion, etc.

At (510), the method 500 may include determining a magnitude of deflection of the boom assembly based on the target characteristics of the modified image data, e.g., using one or more data analysis or processing techniques, algorithms, and/or the like. For example, the method may analyze the modified image data using any suitable image processing techniques. Suitable processing or analyzing techniques may include performing spatial analysis on received images or image data. For instance, geometric or spatial processing algorithms, shape detection and/or edge-finding or perimeter-finding algorithms, and/or the like may differentiate the shape, color, edges, and/or the like of the boom arm(s) and/or target(s) from expected features in the image frame. Once the data analysis module determines the target characteristics within modified image data, the target characteristic may be combined with the location of the cropped modified image data to the full frame of the original image frame to determine the magnitude of the deflection of the first boom arm and/or the second boom arm of the boom assembly.

At (512), the method 500 can include controlling an operation associated with the agricultural machine based at least in part on the deflection of the boom section. In some instances, the operation associated with the agricultural machine can include adjusting at least one of a ground speed of the agricultural machine, controlling an operation of the user interface(s) to indicate the variation in the pitch of the boom sections, controlling an actuator associated with one or more the boom sections to adjust a position of the boom sections, controlling an operation of one or more of the plurality of nozzle assemblies (e.g., valves of the nozzle assembly(ies)) and/or associated pump(s), and/or any other action.

At (514), the method 500 can include determining an error difference between the estimated boom position and the magnitude of deflection based on the modified image data. If the error difference is equal to or exceeds a defined error threshold, at (516), the method 500 can include updating the machine-learned model.

In various examples, the method 500 may implement machine learning methods and algorithms that utilize one or several machine learning techniques including, for example, decision tree learning, including, for example, random forest or conditional inference trees methods, neural networks, support vector vehicles, clustering, and Bayesian networks. These algorithms may include computer-executable code that may be retrieved by the computing system and/or through a network/cloud and may be used to evaluate and update the boom deflection model. In some instances, the machine learning engine may allow for changes to the boom deflection model to be performed without human intervention.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural system comprising:
   a boom assembly including a frame section and a boom section pivotably coupled to the frame section;
   one or more nozzle assemblies operably coupled with the boom assembly;
   a boom movement sensor having a field of view directed along a portion of a length of the boom section and configured to generate image data;
   a machine sensor configured to generate machine data; and
   a computing system communicatively coupled to the boom movement sensor and the machine sensor, the computing system being configured to:
   determine an estimated boom position of the boom section based at least in part on the machine data;
   determine a position of a target within the image data based at least in part on the estimated boom position of the boom section;
   modify the image data based on the position of the target to create modified image data; and
   determine a magnitude of deflection based on the modified image data.

2. The agricultural system of claim 1, wherein the computing system is further configured to:
   control an operation associated with an agricultural machine operably coupled with the boom assembly based at least in part on the magnitude of the deflection of the boom section.

3. The agricultural system of claim 2, wherein the computing system is further configured to:
   control the operation associated with the agricultural machine operably coupled with the boom assembly when the magnitude of the deflection of the boom section is greater than a threshold deflection.

4. The agricultural system of claim 1, wherein the computing system is further configured to:
   determine a presence of the target within the modified image data; and
   discard the modified image data when the target is not present in the modified image data.

5. The agricultural system of claim 1, wherein the computing system is further configured to:
   determine a presence of the target within the modified image data; and
   alter the modified image data when the target is not present in the modified image data.

6. The agricultural system of claim 1, wherein the computing system is further configured to:
   determine an error difference between the estimated boom position and the magnitude of deflection based on the modified image data.

7. The agricultural system of claim 1, wherein modifying the image data based on the position of the target to create modified image data comprises cropping the image data based at least in part on the estimated boom position of the target within the image data.

8. The agricultural system of claim 7, wherein at least fifty percent of the image data is cropped from the modified image data.

9. The agricultural system of claim 1, wherein the boom movement sensor is positioned on the frame section.

10. An agricultural method for determining a magnitude of deflection of a boom assembly, the agricultural method comprising:
    determining, with a computing system, an estimated boom position of a boom section;
    receiving, with the computing system, image data generated by a boom movement sensor having a field of view directed along a portion of a length of a boom section;
    determining, with the computing system, a position of a target within the image data based at least in part on the estimated boom position of the boom section;
    modifying, with the computing system, the image data based on the position of the target to create modified image data; and
    determining, with the computing system, a magnitude of deflection based on the modified image data.

11. The agricultural method of claim 10, further comprising:
    receiving, with the computing system, machine data generated by a machine sensor, wherein the estimated boom position of the boom section is based at least in part on the machine data.

12. The agricultural method of claim 11, further comprising:
    controlling, with the computing system, an operation associated with an agricultural machine based at least in part on the magnitude of the deflection of the boom section.

13. The agricultural method of claim 11, wherein modifying, with the computing system, the image data based on the position of the target to create modified image data further comprises cropping the image data based at least in part on the estimated boom position of the target within the image data.

14. The agricultural method of claim 10, wherein the estimated boom position of the boom section is determined through one or more machine-learned models.

15. The agricultural method of claim 14, further comprising:
    determining, with the computing system, an error difference between the estimated boom position and the magnitude of deflection based on the modified image data.

16. The agricultural method of claim 15, further comprising:
    updating the one or more machine-learned models when the error difference is equal to or exceeds an error threshold.

17. An agricultural system comprising:
    a boom assembly including a frame section and a boom section pivotably coupled to the frame section; and a computing system configured to:
receive historical data of a position of the boom assembly from a machine database; and
determine a magnitude of deflection of the boom assembly based in part on the historical data.

18. The agricultural system of claim 17, further comprising:
a boom movement sensor having a field of view directed along a portion of a length of the boom section and configured to generate image data,
wherein the computing system is communicatively coupled to the boom movement sensor, and wherein the computing system is configured to determine a position of a target within the image data, modify the image data based on the position of the target to create modified image data, and determine the magnitude of deflection based in part on the modified image data.

19. The agricultural system of claim 17, further comprising:
a machine sensor configured to generate machine data,
wherein the computing system is further configured to determine an estimated boom position of the boom section based at least in part on the machine data.

20. The agricultural system of claim 17, wherein the computing system is further configured to:
control an operation associated with an agricultural machine based at least in part on the magnitude of the deflection of the boom section.

* * * * *